(12) United States Patent
Besselmann et al.

(10) Patent No.: US 10,938,321 B2
(45) Date of Patent: Mar. 2, 2021

(54) SWITCHING AN ELECTRICAL VOLTAGE SOURCE CONVERTER

(71) Applicant: ABB Schweiz AG, Baden (CH)

(72) Inventors: Thomas Besselmann, Birmenstorf (CH); Martin Bruha, Brugg (CH); Pieder Jörg, Domat/Ems (CH); Stefan Almer, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/416,789

(22) Filed: May 20, 2019

(65) Prior Publication Data

US 2019/0273446 A1 Sep. 5, 2019

Related U.S. Application Data

(63) Continuation of application No. PCT/EP2017/079658, filed on Nov. 17, 2017.

(30) Foreign Application Priority Data

Nov. 18, 2016 (EP) .................................... 16199635

(51) Int. Cl.
*H02P 6/00* (2016.01)
*H02M 7/525* (2006.01)
*H02P 25/024* (2016.01)
*H02M 5/451* (2006.01)
*H02P 27/06* (2006.01)

(52) U.S. Cl.
CPC ........... *H02M 7/525* (2013.01); *H02M 5/451* (2013.01); *H02P 25/024* (2016.02); *H02P 27/06* (2013.01)

(58) Field of Classification Search
CPC ............................ H02M 7/525; H02M 25/024
USPC ....................................................... 318/400.29
See application file for complete search history.

(56) References Cited

U.S. PATENT DOCUMENTS

| | | | |
|---|---|---|---|
| 4,047,083 A * | 9/1977 | Plunkett | H02M 7/483 318/807 |
| 4,066,954 A * | 1/1978 | Vukasovic | H02M 7/525 363/37 |
| 4,084,220 A | 4/1978 | Akamatsu | |
| 4,426,611 A | 1/1984 | Espelage et al. | |
| 4,443,747 A | 4/1984 | Chausse et al. | |

(Continued)

OTHER PUBLICATIONS

European Patent Office, International Search Report & Written Opinion issued in corresponding Application No. PCT/EP2017/079658, dated Mar. 9, 2018, 10 pp.

*Primary Examiner* — Erick D Glass
(74) *Attorney, Agent, or Firm* — Taft Stettinius & Hollister LLP

(57) ABSTRACT

An electrical converter with at least two output phases includes a rectifier and a thyristor-based inverter interconnected by a DC link with an inductor, wherein the thyristor-based inverter includes a half-bridge with at least two half-bridge arms for each output phase of the electrical converter and each arm being provided by a thyristor. A method for switching the electrical converter includes: cyclically switching the thyristors of the inverter, such that at least one time instant, two thyristors of different half-bridge arms are switched on simultaneously, such that a pulse number, which determines at how many time instants thyristors of the inverter are switched during one stator voltage period, is lower than the number of half-bridge arms of the inverter.

18 Claims, 7 Drawing Sheets

(56) References Cited

U.S. PATENT DOCUMENTS

| | | | |
|---|---|---|---|
| 4,814,964 A | | 3/1989 | Schauder et al. |
| 5,825,152 A | * | 10/1998 | Eriksson ............... H02P 25/024 |
| | | | 318/700 |
| 2013/0049660 A1 | | 2/2013 | De Franciscis |
| 2014/0268926 A1 | * | 9/2014 | Gupta ................... H02M 1/126 |
| | | | 363/35 |
| 2015/0303855 A1 | | 10/2015 | Verhulst |
| 2017/0294864 A1 | * | 10/2017 | Tada ...................... H02P 29/50 |

\* cited by examiner

Fig. 7
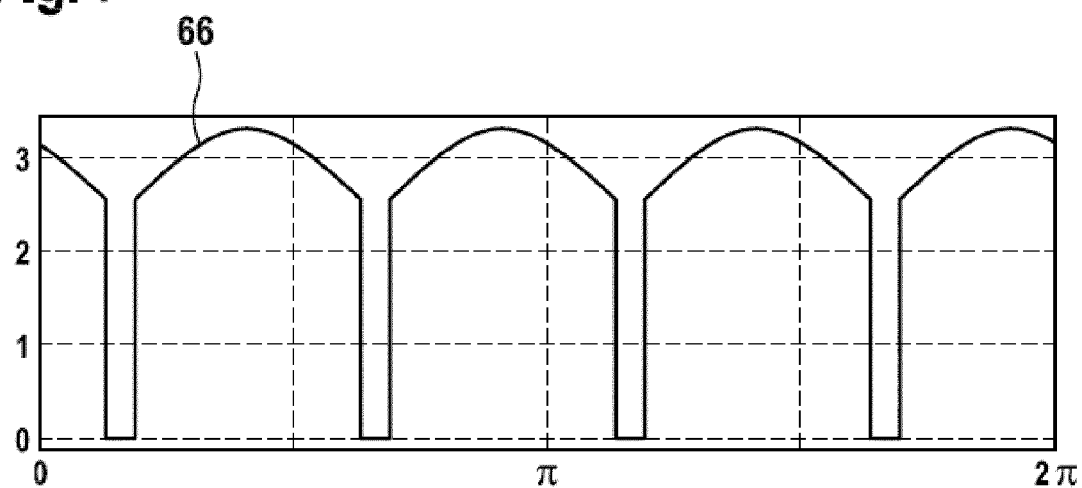
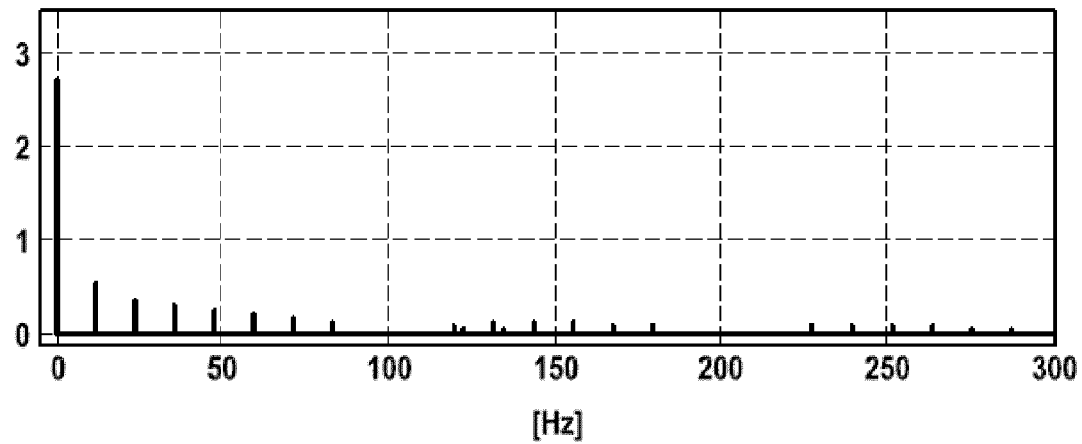

SWITCHING AN ELECTRICAL VOLTAGE SOURCE CONVERTER

FIELD OF THE INVENTION

The invention relates to the field of current source inverters. In particular, the invention relates to a method for switching an electrical converter, a controller and an electrical drive system.

BACKGROUND OF THE INVENTION

A variable speed synchronous machine may be connected to an electrical grid via a line commutated rectifier and a load commutated inverter. This type of variable speed solution is often the preferred choice in high power applications, ranging from a few megawatts to over a hundred megawatts. For example, such applications include high speed compressors and rolling mills.

Electric drives such as the load commutated inverter are typically employed to transform AC power of fixed frequency into AC power of varying frequency, or vice versa. The AC power of fixed frequency is provided by the electric grid, while the AC power of varying frequency is used to drive an electric AC machine such as the synchronous machine. By means of electric drives it is possible to control the drive torque and thus to operate the AC machine at selectable speeds. Varying the speed of machinery has several advantages compared to fixed-speed operation, the most prominent one being the ability to save energy by running the machinery at lower speeds.

In most configurations, the frequency transformation is carried out in a two-step approach: First, the AC power of fixed frequency is rectified to DC power and subsequently, the DC power is inverted into AC power of the desired frequency. In the power generation mode, the power flow is reversed and the varying-frequency AC power of the machine is rectified to DC power and subsequently inverted into fixed-frequency AC power of the grid.

The synchronous machine is usually attached to some machinery via a drive shaft and possibly one or multiple gear boxes. These drive trains often possess some pronounced resonance frequencies, which, if excited, can result in high torsional oscillations resulting in increased wear of the machinery or a failure of equipment.

In typical drive train installations, the drive shaft is comparably long and thin, resulting in pronounced resonance frequencies at which, if excited, the masses of the rotor of the synchronous machine and the machinery oscillate against each other. These resonance frequencies are called the torsional natural frequencies (TNFs) of the drive shaft.

While the inertias and the elasticity of the elements of the drive shaft can be determined from their design and material characteristics and are thus rather well known, the damping is more uncertain. This leads to a situation, where the locations of the TNFs are known, whereas the amplification at these frequencies is estimated based on experience.

Couplings along the drive shaft may be designed to sustain torque up to a certain threshold, and violating these thresholds leads to increased wear or even failure. While these thresholds are usually not reached during normal operation of the drive train, exciting the TNFs can result in dangerous torque levels at the couplings.

The load commutated inverter on the machine side may be based on thyristors. During startup or when the rotor is turning slowly, the stator voltage of the synchronous machine may be too low to ensure commutation of the thyristors on the machine side of the load commutated inverter. In order to facilitate the commutation of the thyristors, while the stator voltage of the synchronous machine is too low to support a normal commutation, a special mode of operation may be applied, which usually is called forced commutation or pulse mode. For example, U.S. Pat. No. 4,443,747 describes how such a pulse mode may be included in a startup sequence of a load commutated inverter. In U.S. Pat. No. 4,084,220, the switching of a power converter based on thyristor bridges is described.

U.S. Pat. No. 5,825,152 shows a load-commutated synchronous motor drive, in which the network-side converter may be switched to a lower pulse number compared with respect to a natural pulse number.

US 2015/0303855 A1 and US 2013/0049660 A1 show methods for damping torsional resonances of a mechanical drive by varying the drive frequency.

DESCRIPTION OF THE INVENTION

In the pulse mode, higher harmonics may be produced, which may get into resonance with the torsional natural frequencies (TNFs) of the drive shaft.

It is an objective of the invention to operate a thyristor-based inverter during pulse mode, such that an excitation of natural frequencies of the drive shaft stays low.

This objective is achieved by the subject-matter of the independent claims. Further exemplary embodiments are evident from the dependent claims and the following description.

A first aspect of the invention relates to a method for switching an electrical converter with at least two output phases. The electrical converter may be a power converter adapted for converting currents of more than 10 A and/or more than 1 kV. The electrical converter may comprise a rectifier and a thyristor-based inverter, which are interconnected by a DC link with an inductor. In other words, the converter may be a current source converter. The thyristor-based inverter may be seen as load commutated inverter. Also the rectifier may be based on thyristors.

The thyristor-based inverter may comprise a half-bridge for each output phase of the electrical converter, wherein each half-bridge comprises two half-bridge arms and each arm is provided by at least one thyristor. A half-bridge may comprise an upper arm and a lower arm, each of which provides a switch, which, in the present case, is provided by one or more thyristors. In the case of more than one thyristor per arm, the thyristors may be connected in series and/or in parallel. Also, the rectifier may be designed in such a way, i.e. with a half-bridge for each input phase.

The method may be performed by a controller, which is adapted for generating switching signals (i.e. firing signals) for the thyristors of the inverter and optionally for the thyristors of the rectifier.

According to an embodiment of the invention, the method comprises, during a normal pulse operation mode, cyclically switching the thyristors of the inverter such that a pulse number, which determines at how many time instants thyristors of the inverter are switched during one stator voltage period, is equal to the number of half-bridge arms of the inverter. Furthermore, the method comprises, during a low pulse operation mode, cyclically switching the thyristors of the inverter, such that at at least one time instant, two thyristors of different half-bridge arms are switched on simultaneously, such that the pulse number, is lower than the number of half-bridge arms of the inverter.

In the low pulse operation mode, the number of pulses during a stator voltage period may be lower than in the normal pulse operation mode. In such a way, different higher order harmonics may be produced in the low pulse operation mode, which higher order harmonics then may be different from the torsional natural frequencies of the drive shaft.

It may be that when one arm is switched on, its thyristor all its thyristors are fired, i.e. switched on. To fire or to switch on a thyristor may mean to bring the thyristor into a conducting state. This may be performed by applying a gate signal to the thyristor.

It has to be noted that at a time instant, two or more half-bridge arms of the inverter may be switched on simultaneously. During the normal pulse operation mode, every half-bridge arm may be switched on one time during a stator voltage period and only one half-bridge arm may be switched on at every time instant. During the low pulse operation mode it may be that every half-bridge arm may be again switched on one time during a stator voltage period and that more than one half-bridge arm may be switched on at that time.

Cyclically switching may mean that a switching pattern, which has a length of one or more stator voltage periods is applied to the inverter repeatedly. This switching pattern defines the positions of the time instants and the arms, which have to be switched on at the time instants.

Additionally, the method further comprises estimating a stator frequency of an electrical machine supplied by the electrical converter; and switching between the normal operation mode and the low pulse operation mode based on the stator frequency.

The stator frequency may be determined based on reference signals supplied to the controller and providing a reference for the stator frequency and/or a rotor speed of the electrical machine. Alternatively or additionally, the stator frequency may be determined based on measurements of the stator voltage of the electrical machine and/or by measuring the rotor speed of the electrical machine.

With the method, the pulse number may be changed depending on the stator frequency. For example, when the stator frequency is below a specific limiting stator frequency or within a specified stator frequency interval, the pulse number, which is used in a normal pulse operation mode, is changed to another pulse number, which is used in an operation mode, in which the number of pulses is reduced, i.e. the low pulse operation mode.

According to an embodiment of the invention, the method further comprises selecting the pulse number of the low pulse operation mode based on the stator frequency. It may be that the low pulse operation mode may be performed with different pulse numbers. In other words, there may be more than one pulse number for the low pulse operation mode. The pulse number then may be selected based on the stator frequency to avoid torsional resonances.

According to an embodiment of the invention, the low pulse operation mode is performed, when the stator frequency is below a limiting stator frequency. The reduction of the pulse number during a stator voltage period only may be performed during a low speed operation mode and/or in particular at a rotor speed or stator voltage frequency, at which mechanical resonances (such as TNFs) are present. In such a way, the low pulse operation mode also may be a low speed operation mode, in which the speed of the drive shaft is lower than during the normal pulse operation mode.

The limiting stator frequency and/or a specified stator frequency interval, in which the low pulse operation is performed, may be chosen, such that the pulse number is changed, when the drive train and, in particular, the drive shaft to which the electrical machine is mechanically connected with its rotor is in resonance with harmonics that would be generated by the pulse pattern and/or pulse number used in the normal pulse operation mode. In such a way, excitations of the TNFs of the drive shaft due to harmonics of the electrical drive system may be mitigated.

According to an embodiment of the invention, the time instants determined by the pulse number are equidistant. The voltage period of the stator voltage, i.e. the period between two extrema of a phase of the stator voltage and/or between two zero-crossings of a phase of the stator voltage in the same direction, may be divided into equally long intervals, which are bordered by the time instants. Such equidistant time instants may result in comparable low harmonics in the torque.

According to an embodiment of the invention, the thyristors are switched, such that a drive torque and/or a DC link current are a pulse train with constant height. In other words, the reference of the drive torque and/or the DC link current may be piecewise constant functions. The DC link current may only jump between zero and a constant value. The drive torque may only jump between zero, a positive or a negative value. Such modelled quantities also may result in comparable low harmonics in the torque.

According to an embodiment of the invention, thyristors of the rectifier are switched, such that at each time instant, the voltage applied to the DC link becomes negative during a pulse gap surrounding the time instant. Furthermore, it may be that during a time instant, a pulse gap is introduced by the rectifier of the converter, which may mean that within a time interval, i.e. the pulse gap, including the time instant, the rectifier is switched, such that the voltage in the DC link becomes negative. In such a way, the thyristors switched in the inverter may be supplied with a negative voltage and therefore may switch into a blocking state.

It has to be noted that simultaneously switching on may mean that the switching on of the two thyristors and/or two half-bridge arms occur in a time interval much smaller than the stator voltage period, such as 1% of the stator voltage period. For example, the two thyristors and/or half-bridge arms may be switched on within the same pulse gap.

According to an embodiment of the invention, the time instants are distributed in the stator voltage period, such that a weighted sum of harmonics in a drive torque and/or a DC link current is minimized. It also may be that the distances of the time instants are optimized offline, such that for a given rotor speed the time instants are distributed to minimize resonances. This may be performed by minimizing a weighted sum of the harmonics of the drive torque or DC link current. Due to this optimization process, the distribution of time instants within a stator voltage period for a given stator frequency and/or stator frequency interval may be determined. For example, it may be that in a first operation mode, such as a normal pulse operation mode, the time instants are equidistant, while in a second operation mode, such as the low pulse operation mode and/or a low speed operation mode, the distances between neighbouring time instants for a reduced number of pulses may differ with respect to each other.

As already mentioned, during the low pulse operation mode and/or a low speed operation mode, the pulse number is lower than the number of half-bridge arms of the inverter. Usually, in the normal pulse operation mode, every half-bridge arm (or more general the thyristors provided by the half-bridge arm) is switched one time during the stator voltage period. To reduce higher order harmonics, it may be that at one time instant, two or more half-bridge arms are switched simultaneously. This switching may be performed in the same cycle as during the normal pulse operation mode. In general, the number of pulse gaps or the number of switching time instants per stator voltage period may not match the number of half-bridge arms of the inverter.

In general, the pulse number during the low pulse operation mode and/or low speed operation mode is smaller than the pulse number during normal operation. In particular, the pulse number during low pulse and/or speed operation may be an integer fraction of the pulse number during normal operation.

For example, the pulse number may be equal to half the number of half-bridge arms of the inverter, the pulse number may be equal to one third of the number of half-bridge arms of the inverter and/or the pulse number may be equal to two third of the number of half-bridge arms of the inverter.

For example, the inverter may comprise 6, 12, 18 or 24 half-bridge arms (i.e. may be composed of one, two, three or four three-phase bridges). In these cases, the pulse number may be 2, 3 and/or 4 (6 half-bridge arms), 4, 6 and/or 8 (12 half-bridge arms), 6, 9 and/or 12 (18 half-bridge arms) and 8, 12 and/or 16 (24 half-bridge arms).

In the case of an integer pulse number, every stator voltage period may be divided into time intervals between time instants in the same way. However, it also may be possible that the time intervals and/or time instants are periodically distributed above more than one stator voltage period.

According to an embodiment of the invention, the pulse number is non-integer. For example, when the pulse number is a multiple of $(2n+1)/2$ with $n=1, 2, 3, \ldots$, the corresponding time instants may be distributed periodically above two stator voltage periods. This may facilitate reducing higher order harmonics at very low speed.

According to an embodiment of the invention, during the normal pulse operation mode each half-bridge arm is switched on one time during the stator voltage period. During a pulse operation mode (with or without reduced pulse number), every time instant two, three or more half-bridge arms may be switched on.

The method may be applied to different topologies of inverters. In a simple case, the inverter comprises a half-bridge per phase, i.e. two series-connected switches, which provide an AC phase connection point between them. Everyone of the switches comprises at least one thyristor. It has to be understood that the thyristors, which compose one switch, may be seen as one thyristor in the present disclosure.

In the above and in the following, a parallel connection of half-bridges for each phase is called multi-phase bridge. A three-phase bridge may comprise three half-bridges connected in parallel to the DC link.

According to an embodiment of the invention, two half-bridge arms simultaneously switched on are located in one multi-phase bridge of the inverter. It may be that the invert comprises solely one multi-phase bridge. For example, an upper and a lower arm of the multi-phase bridge may be switched on simultaneously.

According to an embodiment of the invention, two simultaneously switched half-bridge arms are located in different multi-phase bridges of the inverter. It may be that the inverter comprises more than one multi-phase bridge, which may be connected to one or more DC links. In this case, simultaneously switched half-bridge arms may be situated in different multi-phase bridges. It also may be that switching patterns of different multi-phase bridges have equal time instants or that switching patterns of different multi-phase bridges are offset with respect to each other.

According to an embodiment of the invention, two half-bridge arms simultaneously switched on are an upper arm and a lower arm of a multi-phase bridge. A further possibility is that multiple half-bridge arms of the same multi-phase bridge are switches at the same time instant. For example, the upper arms of the multi-phase half-bridge may be switched cyclically at different time instants and the lower arms of the multi-phase half-bridge may be switched cyclically at different time instants, wherein one or more of the upper and lower arms are switched at the same time instant.

According to an embodiment of the invention, at specific time instants, only one half-bridge arm of a multi-phase bridge is switched on. It also may be possible that a switching on of multiple half-bridge arms occurs only at some time instants but not at all time instants. For example, the switching on of six half-bridge arms may be distributed among four time instants, such that at two time instants, one of the six half-bridge arms is switched on, while at two other time instants, two half-bridge arms are switched on.

A further aspect of the invention relates to a controller for an electrical converter, wherein the controller is adapted for performing the method as described in the above and in the following. For example, the controller may be based on a DSP and/or an FPGA. It also may be that the method is implemented at least partially in software and/or that the method is run in a processor provided by the controller.

According to an embodiment of the invention, the controller comprises a pulse generation stage for determining a firing angle sequence for a stator voltage period at which thyristors are switched; and a modulator for generating the time instants based on the selected firing angle sequence.

According to an embodiment of the invention, the controller comprises at least two pulse generation stages for determining firing angle sequences for a stator voltage period at which thyristors are switched; a pulse number selector stage for selecting a firing angle sequence based on the stator frequency; and a modulator for generating the time instants based on the selected firing angle sequence. For example, the method may be implemented in such a way that a conventional controller with a modulator stage, which is adapted for generating the firing or switching signals, is provided with additional stages that, dependent on the actual stator frequency, select different pulse generation stages, which generate different firing angle sequences. Thus, only a small part of the controller may have to be modified.

A further aspect of the invention relates to an electrical drive system, which comprises a controller as described in the above and in the following. The electrical drive system may be seen as a current source inverter system.

The electrical drive system may furthermore comprise a rectifier for rectifying a multi-phase AC current, which for example may be supplied by an electrical grid, a DC link with an inductor supplied by the rectifier, and a thyristor-based inverter, which is adapted for converting the DC current in the DC link into a multi-phase AC current.

According to an embodiment of the invention, the electrical drive system further comprises a synchronous electrical motor supplied by the thyristor-based inverter. By switching the thyristors of the inverter, the controller may control the speed of the electrical motor, which may be used in an industrial environment, for example for driving a pump or a turbine.

It has to be understood that features of the method as described in the above and in the following may be features of the controller and/or the drive system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

FIG. 7 shows diagrams with mechanical quantities produced during performing a method according to an embodiment of the invention.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

System Overview

Figure 1:
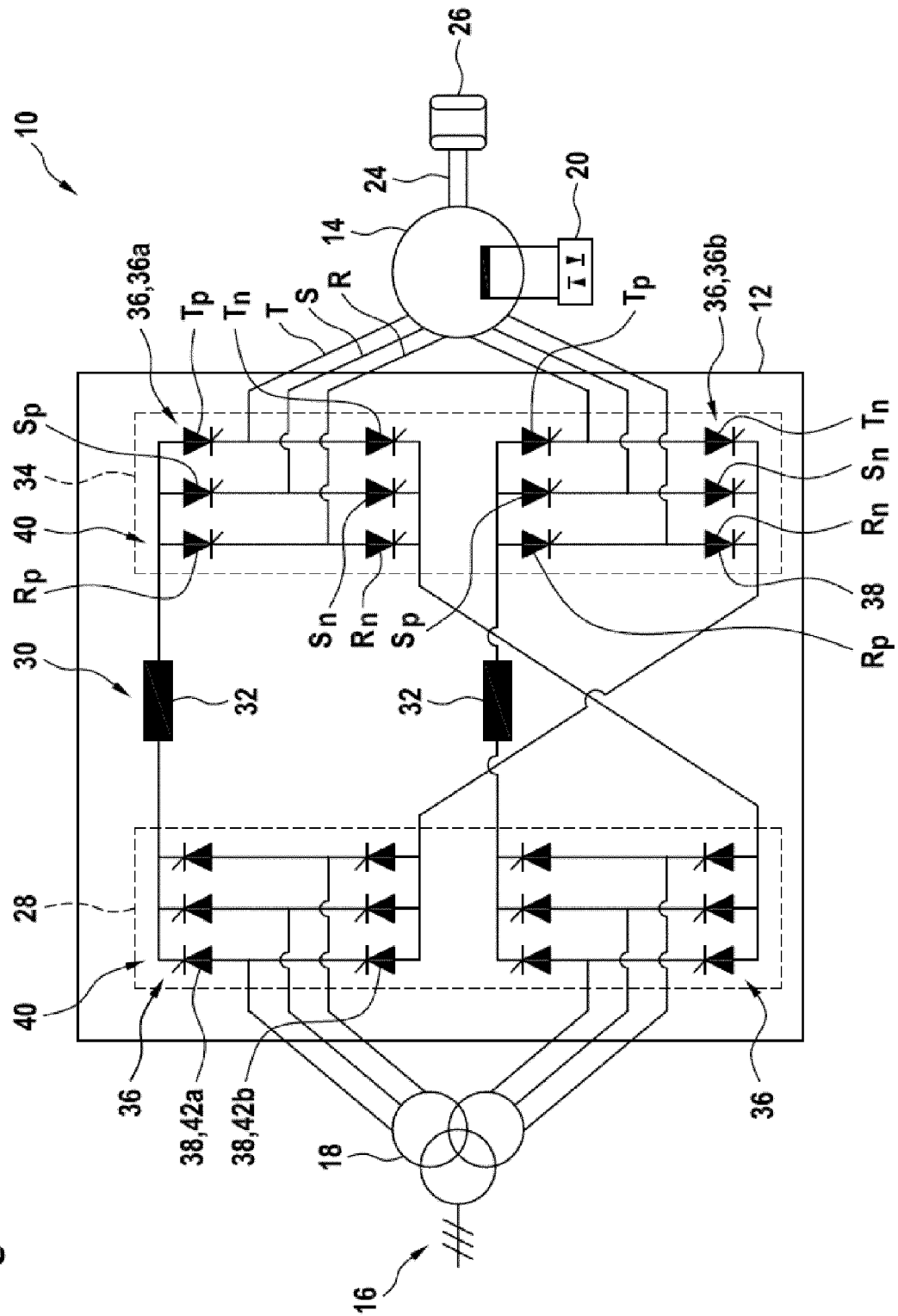
FIG. 1 schematically shows an electrical drive system according to an embodiment of the invention.

FIG. 1 shows an electrical drive system 10 comprising an electrical converter 12 for converting a multi-phase AC current from an electrical grid 16 into a multi-phase current to be supplied to an electrical machine 14. It may be that the power flow through the converter 12 is from the grid to the electrical machine 14 or vice versa from the electrical machine 14 to the grid 16.

The load commutated converter 12 is connected to the grid 16 via a transformer 18, which transforms a three-phase current from the grid 16 into a current with two pairs of three phases. On the machine side, the converter 12 also generates a current with two pairs of phases, which are supplied to the double-winding synchronous machine 14.

The rotor of the electrical machine 14 is excited by means of an excitation system 20 and/or is attached to a drive shaft 24 and some machinery 26, such as a pump or turbine.

The converter 12 comprises a rectifier 28 in the form of a line side converter 28, a DC link 30 with inductances 32 and an inverter 34 in the form of a machine side converter 34. Both the line side converter 28 and the machine side converter 34 are in a so-called 12-pulse configuration, meaning that they each consist of two multi-phase bridges 36 with six thyristors 38. For the machine side inverter 34, the first and second multi-phase bridges are indicated as 36a and 36b.

Each multi-phase bridge 36 comprises three half-bridges 40, each of which comprises an upper arm 42a and a lower arm 42b in the form of a thyristor 38. The half-bridges 40 are connected in parallel at the side of the DC link 30 and provide a midpoint between the two arms 42a, 42b to which the corresponding phase of an AC current is connected.

It has to be noted that here and in the following one thyristor 38 may be replaced by two or more thyristors that are connected in series and/or in parallel and that are switched simultaneously.

The positive sides of the two multi-phase bridges 36 of the rectifier 28 are connected via inductors 32 of the DC link 30 with the positive sides of the two multi-phase bridges 36a, 36b of the inverter 34. The negative sides of the two multi-phase bridges 36 of the rectifier 28 are connected crosswise with the negative sides of the two multi-phase bridges 36a, 36b of the inverter 34, such that a negative side is connected with the other one of the multi-phase bridges as the positive side.

The double-winding synchronous machine 14 has two sets of three-phase windings, mounted at a phase difference of 30° towards each other. Without loss of generality it is assumed in the following, that the stator voltage applied to the multi-phase bridge 36b lags the stator voltage at the multi-phase bridge 36a by 30°.

While the system 10 shown in FIG. 1 comprises a converter 12 with 12-pulse configuration, the reduction of the pulse number as described in the above and in the below may be applied to different configurations, for example to a 6-pulse, 18-pulse or 24-pulse configuration. For example, the converter 12 of FIG. 1 may comprise one, two, three or more multi-phase bridges 36 on the side of the rectifier 28 and/or the side of the inverter 34.

By operating the two multi-phase bridges 36a, 36b phase-shifted by 30°, the harmonics in the drive torque may be reduced. The name 12-pulse configuration stems from the fact that for each AC voltage period on the AC side of the converter 12, each thyristor 38 is fired once, resulting in twelve pulses per period. The inverter 34 (and also the rectifier 28) are switched that the number of switching pulses per period, i.e. the pulse number, is equal to the number of thyristors 38 of the inverter 34 (and rectifier 28). This may coincide with the maximal number of pulses per AC voltage period permitted by the converter.

The thyristors 38 in the converter 12 can be either in a conducting state or in a blocking state, in which a current through the respective thyristor 38 is conducted or blocked. A blocked thyristor 38 can switch to the conducting state (which is called turn-on or switch-on), if the voltage over the thyristor 38 is positive and a firing or switching command is applied to a gate of the thyristor 38. However, a conducting thyristor 38 cannot be switched from its conducting state to its blocking state (which is called turn-off or switch-off) only by a switching command. A negative voltage may have to be applied to the thyristor and/or no current may have to flow through the thyristor 38 for it to switch to its blocking state.

During normal operation, the stator voltage of the electrical machine 14 may be modelled as a sinusoidal with a certain frequency and amplitude. The thyristors 38 in the inverter 34 may be fired in order to keep the stator current in a certain angle with respect to the stator voltage. The transfer of conducting current from one thyristor 38 to the next may be called commutation. The commutation is initiated by firing a thyristor 38, and for a short amount of time, two thyristors 38 are conducting the current from the DC link 30. During the commutation, the stator voltage increases the current flowing in the just fired thyristor 38 and decreases the current flowing in the previously conducting thyristor 38. Thus, the stator voltage ensures that the current from the DC link 30 is handed over from one thyristor to the next. Finally, the stator voltage reduces the amount of current flowing through the previously conducting thyristor to zero and this thyristor switches to the blocking state. Note that the current in the DC link 30 is not affected by this commutation procedure. The name load commutated converter 12 may be based on the fact that an alternating voltage of the load, i.e. the stator voltage, is required for this commutation procedure to take place.

There are situations, when the AC voltage on the load side of the converter 12, i.e. the stator voltage, is not sufficient to ensure a timely turn-off of the respective thyristor 38 during the commutation procedure described above. For example, these situations occur during startup of the synchronous machine and/or when operating the synchronous machine at low speeds.

When the stator voltage, i.e. the machine side AC voltage generated by the electrical machine 14, is not large enough for a timely extinguishing of the thyristor current, the thyristor current of the machine side thyristors 38 of the inverter 34 may be extinguished with the aid of the rectifier 28. When a commutation is to be executed on the inverter 34, also a negative voltage may be generated by the rectifier 28, extinguishing the current in the DC link 30, and applying a negative voltage over the thyristors 38 in the inverter 34. All thyristors 38 of the inverter 34 are then turned off. Afterwards, a positive voltage may be generated in the DC link 30 by the rectifier 28, and the appropriate thyristor 38 of the inverter 34 is fired. Such an operation mode may be called normal pulse operation mode.

By applying this procedure, i.e. the normal pulse operation mode, the commutation of the inverter 34 is possible, however, the current in the DC link 30 may be affected. For each commutation (12 times per rotation or stator voltage period), a pulse gap may have to be introduced, i.e. the current in the DC link 30 is decreased to zero and ramped up again in a time interval encompassing the switching time instant, at which a thyristor 38 of the inverter 34 is switched on and another one off. For example, a pulse gap may have a duration of about 10 ms, while the whole period of the stator voltage may be about 300 ms. Thus, a pulse gap may have a length of less than 5% of the length of the period of the stator voltage period.

The electrical drive system 10 with the load commutated converter 12 is not capable of generating a perfectly smooth drive torque. The switching patterns of the thyristors 38 of the rectifier 28 and the inverter 34 determine a frequency content of the drive torque and in particular the higher order harmonics in the drive torque. The generated harmonic content depends among others on the frequency of the AC voltage on the line side provided by the electrical grid 16 and the switching of the inverter 34 on the machine side of the converter 12.

General Considerations with Respect to Pulse Operation Mode

In general, in low speed situations or startup situation, the converter 12 and, in particular, the thyristors 38 should be switched in a pattern such that on average, the produced drive torque equals a specific reference value, the torsional natural frequencies (TNFs) of the drive shaft 24 are excited as little as possible by the drive torque harmonics generated by the converter 12, and the commutation between the thyristors 38 of the inverter 34 also should be functional, although the electrical machine 14 generates no or a very low stator voltage.

These demands may be reformulated as determining a drive torque function over the rotor angle and the rotor speed, which for a given rotor speed respects the following requirements: The direct component of the drive torque function equals its reference. The DC current, and thus the drive torque, is zero during a number of pulse gaps to ensure commutation of the thyristors 38 of the inverter 34. The harmonics of the drive torque function in a frequency window around the TNFs of the drive shaft 24 are zero or close to zero.

The requirements of minimizing a difference between the drive torque and its reference, while minimizing the harmonics in the drive torque, may be formulated with a cost function $$J_1 = \lambda c_0^2 + \sum_{n=-\infty}^{\infty} |c_n|^2$$

where $c_n$ denotes the nth Fourier coefficient of a function f(x), which denotes the difference between the drive torque signal and its constant reference, and $\lambda$ is a sufficiently large weighting factor. Here, it has been assumed that harmonics in the drive torque are minimized, when the signal energy of the AC content of the drive torque is minimized.

By means of Parseval's theorem, $$\frac{1}{T} \int_{x_0}^{x_0+T} |f(x)|^2 dx = \sum_{n=-\infty}^{\infty} |c_n|^2$$

this cost function for the Fourier coefficients can be translated into a cost function of the difference function f(x) in the time domain.

$$J_2 = \lambda \left( \frac{1}{T} \int_{x_0}^{x_0+T} f(x) dx \right)^2 + \frac{1}{T} \int_{x_0}^{x_0+T} |f(x)|^2 dx$$

Here, T denotes the period of one rotor rotation, $x_0$ specifies the starting time and f(x) the difference function over time.

The direct component of a drive torque function which minimizes $J_2$ equals the specified reference value, and the signal energy of its AC content is minimal. The minimum is obtained by a drive torque function where the area missing due to the pulse gaps is evenly spread out to the other parts of the function. Or, in other words, the drive torque function is zero during the pulse gaps, and obtains a constant value everywhere else. This constant value is determined by the torque reference only.

While the number of pulse gaps is contributing to cost $J_2$, the cost function is unaffected by the location of the pulse gaps. The location of the pulse gaps may be determined by considering an additional requirement, namely, that the signal energy of the AC content of the drive torque is shifted as high as possible. Since usually drive trains are more susceptible to lower frequency oscillations, pushing the signal energy of the AC content to higher frequencies may also lower a general stress of the drive shaft.

Assuming zero DC content of the difference function, this additional requirement may be addressed by minimizing the cost function $$J_3 = \sum_{n \in \mathbb{Z} \setminus \{0\}} \frac{1}{n^2} |c_n|^2$$

Using the indefinite integral of the Fourier coefficients $c_n$ and Parseval's identity, cost function $J_3$ can be reformulated as $$J_3 = \sum_{n \in \mathbb{Z} \setminus \{0\}} |C_n|^2 = \frac{\omega^2}{T} \int_{x_0}^{x_0+T} |F(x)|^2 dx$$

where $F(x)$ denotes the indefinite integral of the difference function between the drive torque and its reference, $C_n$ the Fourier coefficients of the indefinite integral, and $\omega$ the rotor speed.

The indefinite integral of the reference is a ramp, whereas the indefinite integral of the drive torque function is constant during pulse gaps. To minimize the square of the integral of the difference function, the integral of the drive torque function should thus cross the ramp at the middle of each pulse gap and at the middle of each pulse. Limiting the class of candidate functions to those being constant during pulses corresponds to demanding equal distribution of pulse gaps.

Now a class of functions with minimal AC signal energy has been derived, where the signal energy of the AC content is shifted as far as possible to the high frequency domain: The class of piecewise constant functions with equally distributed pulse gaps.

If possible, the drive torque function should belong to this class of functions. If that is not possible for practical reasons, the DC current function may be shaped instead.

The influence of the number of pulse gaps during each stator voltage period may be deduced for the class of functions with minimal AC signal energy. Reducing the number of pulse gaps will reduce cost function $J_2$, and thus the signal energy of the AC content of the signal.

Pulse Operation Mode with Reduced Number of Pulse Gaps

As derived above, the drive torque and/or the DC current in the DC link 30 should be piecewise constant functions with equally distributed pulse gaps, wherein the number of pulse gaps should be less than during the "normal" pulse operation mode as described above, for which the number of pulse gaps is equal to the number of thyristors 38 in the inverter 34.

In the following, several pulse operation modes with a reduced number of pulse gaps or a reduced number of switching time instants are described, which are based on the observation that a DC current function with less pulse gaps as in the normal pulse operation mode may be achieved by switching on several thyristors 38 at the same time instant. Such pulse operation modes may be called low pulse operation modes.

Furthermore, the resonances in the drive shaft 24 may be additionally reduced by selecting the number of pulse gaps and/or time instants during one stator voltage period and thus shifting the harmonics in the stator voltage in such a way that a harmonic does not coincide with the TNFs of the drive shaft 24.

Figure 2:
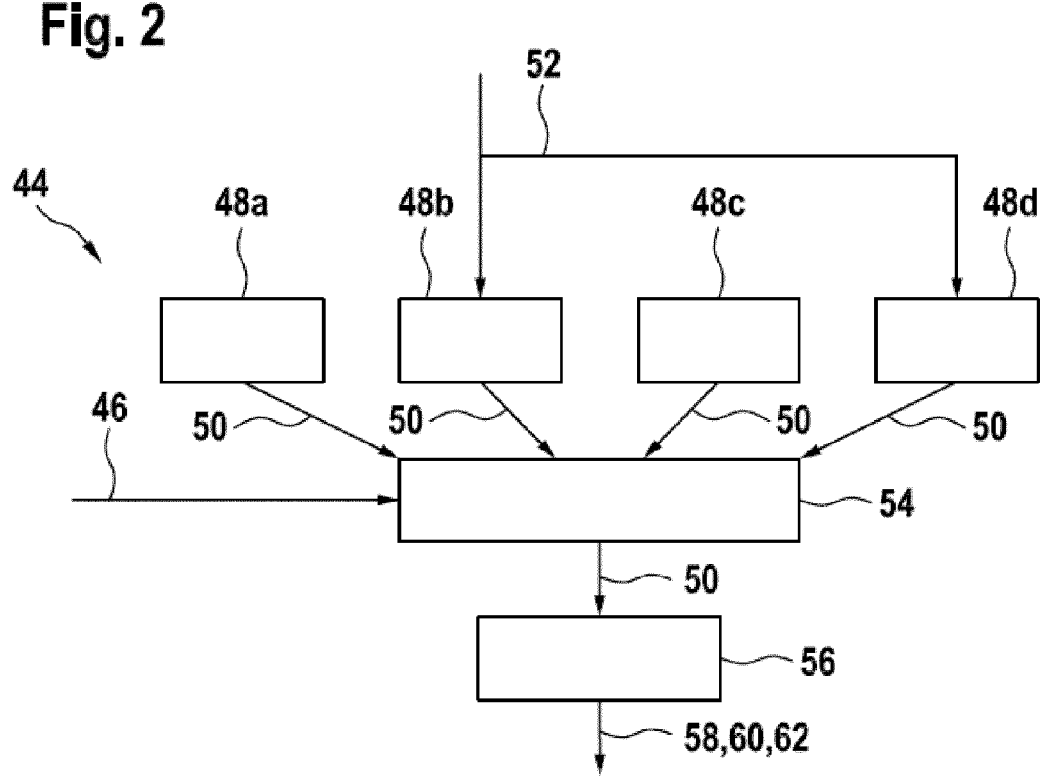
FIG. 2 schematically shows a controller according to an embodiment of the invention.

FIG. 2 shows a controller 44, which is adapted for controlling the converter 12 of FIG. 1 and/or which is adapted for performing several pulse mode operation modes dependent on the rotor speed 46 and/or stator voltage frequency 46.

The controller 44 comprises pulse generation stages 48*a*, 48*b*, 48*c*, 48*d*, which are adapted for determining a set of firing angles 50 or a firing angle sequence 50 for 12-, 8-, 6- and 4-pulse operation modes, respectively. Those firing angle sequences 50 may depend on a stator voltage angle 52. Thus, the pulse generation stages 48*b* and 48*d* for the 8- and 4-pulse operation modes are supplied with a signal for the stator voltage angle 50.

The controller 44 furthermore comprises a pulse number selector stage 54 for selecting a firing angle sequence 50 based on the rotor speed 46 or equivalently the stator voltage frequency and a modulator 56 for generating the time instants 58 based on the selected firing angle sequence 50. From the time instants 58, the modulator may determine the pulse gaps 60 generated by the rectifier 28 and therefrom the commutation signals 62 for the thyristors 38 of the rectifier 28 and the inverter 34.

The following method may be performed by the electrical drive system 10 under the control of the controller 44.

In a first step, the rotor speed 46 or equivalently the stator frequency 46 and the stator voltage angle 52 of the synchronous machine 14 may be measured and/or estimated.

In a second step, depending on the rotor speed 46 or stator voltage frequency 46, the pulse number of time instants 58 and/or pulse gaps 60 per stator voltage period may be selected. This selection may be based on predefined speed or frequency intervals to which a specific pulse number is assigned. In general, the pulse number may be selected, such that the expected excitation of the TNFs of the drive shaft 24 is small.

In a third step, the time instants 58 for switching the thyristors 38 of the inverter 34 are determined from the selected pulse number. Furthermore, the pulse gaps 60 for switching the thyristors 38 of the rectifier 28 may be determined for the selected pulse number and/or from the determined time instants 58. It has to be noted that the pulse number determines the number of time instants 58 and/or pulse gaps 60 during one stator voltage period.

For example, from the selected pulse number, a step function may be determined, which is converted into a reference for the DC current in the DC link 30 and/or the drive torque. The pulse gaps 60 may be inserted into this function depending on the alternating stator voltage. The time instants for switching the thyristors 38 of the inverter 34 may be inserted into the determined pulse gaps 60.

In a fourth step, from the time instants 58 and for example from the beginning and end of the pulse gaps 60, the commutation signals 62 for the thyristors 38 of the rectifier 28 and the inverter 34 may be determined.

The commutation signals 62 for the thyristors 38 of the inverter 34 may be determined such that during one stator voltage period (or more general during one iteration), every thyristor 38 of the inverter is switched on one time at one of the determined time instants 58. In the case, the pulse number is smaller than the number of thyristors 38 of the inverter 34, the thyristors 38 are switched that at some time instants two thyristors 38 are switched on simultaneously.

The thyristors 38 of the inverter 34 may be switched cyclically, i.e. there is a fixed switching sequence of thyristors 38. In this sequence, two succeeding thyristors 38 may be switched on simultaneously. A possible switching sequence of thyristors 38 of a multi-phase bridge 36*a*, 36*b* is to alternately switch on the thyristor 38 from an upper arm 42a and a lower arm 42b of the half-bridges 40 and to cyclically switch on the thyristors 38 of the upper arms 42a and the lower arms 42.

Returning to FIG. 1, symbols Rp, Sp, Tp, Rn, Sn, Tn for six thyristors 38 of the upper and lower multi-phase bridges 36a, 36b are indicated, which connect phase R, S and T to the positive and negative potential of the DC link 30. These symbols are used in FIGS. 3 to 5 for indicating, which one of these thyristors 38 will be switched at specific time instants 58.

Figure 3:
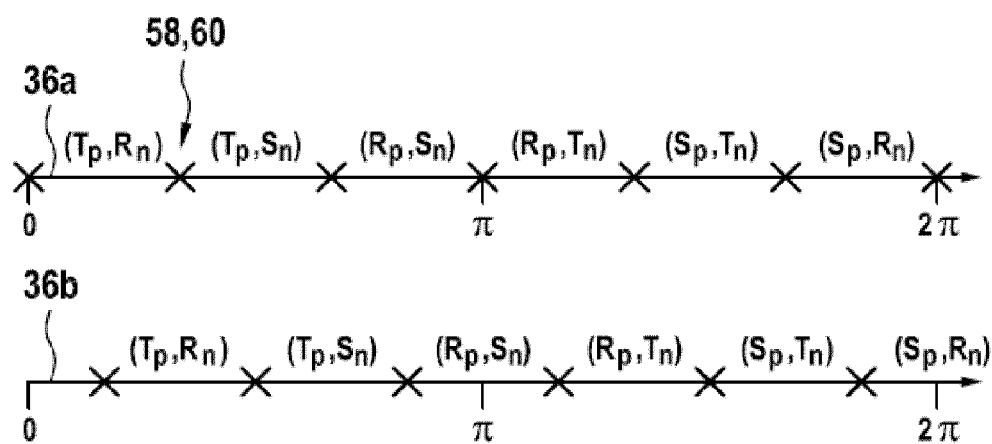
FIG. 3 shows a switching pattern for a normal pulse operation mode.

FIG. 3 shows a normal pulse operation mode for the converter 12 of FIG. 1, in which the inverter 34 is operated with its natural pulse number, i.e. 12 pulses.

FIG. 3 and the following figures show switching patterns for the two multi-phase bridges 36a, 36b over one period of the stator voltage, i.e. from 0 to $2\pi$. The switching time instants 58 and corresponding pulse gaps 60 are shown as crosses. It has to be understood, that the rectifier 28 is switched, such pulse gaps 60 are generated, that start before the corresponding time instant 58 and end after the corresponding time instant 58. For example, the pulse gaps may be centered with respect to the corresponding time instant 58.

In FIG. 3, the six time instants 58 of each multi-phase bridge 36a, 36b are distributed equally spaced (with 60° difference) over the stator voltage period, while the time instants 58 of the one multi-phase bridge 36a are offset to the time instants of the other one multi-phase bridge 36a by 30°.

Furthermore, FIG. 3 and the following figures show, which thyristors 38 are switched on into a conducting state and switched off in a blocking state during the stator voltage period. The two symbols in brackets above an interval between two time instants 58 indicate, which thyristors 38 are in a conducting state. In particular, for each multi-phase bridge 36a, 36b in every interval one thyristor 38 of an upper arm 42a and one thyristor 38 of a lower arm are switched on. The thyristors 38 of the upper arms 42a and the lower arms 42b are switched cyclically and one can see that only one thyristor 38 is switched on at each time instant 58. Every time instant 58, a thyristor 38 is switched on, the previously conducting thyristor is switched off. For example, at the time instant between (Tp, Rn) and (Tp, Sn), the thyristor Rn is switched off and the thyristor Sn is switched on.

Figure 4:
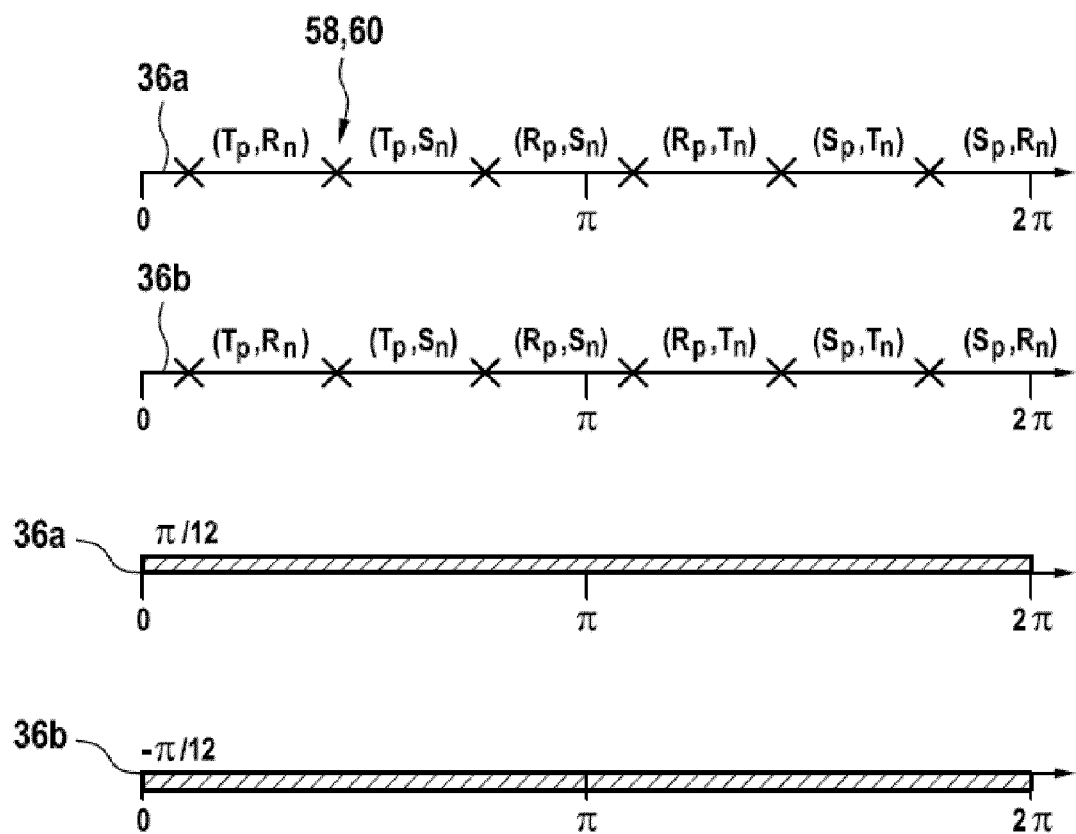
FIG. 4 shows a switching pattern according to an embodiment of the invention.

FIG. 4 shows a diagram corresponding to FIG. 3 for a pulse number of 6. Every time instant 58, two thyristors 38 are switched on. This has been achieved by removing the time offset between the time instants 58 of the first multi-phase bridge 36a and the second multi-phase bridge 36b. For example, as also indicated in FIG. 4, the firing angles 50 of the first multi-phase bridge 36a may be moved by $\pi/12$ or 15° to the right and the firing angles 50 of the second multi-phase bridge 36b may be moved by $\pi/12$ or 15° to the left with respect to the firing angles 50 of the normal pulse operation mode as shown in FIG. 3.

The order of the switching of the inverter 34 stays the same as in FIG. 3. However, at every time instant 58, a thyristor 38 of the first multi-phase bridge 36a and a thyristor 38 of the second multi-phase bridge 36b are switched on simultaneously. For example, at the time instant between (Tp, Rn) and (Tp, Sn), the thyristors Rn of both multi-phase bridges 36a, 36b are both switched off and the thyristors Sn of both multi-phase bridges 36a, 36b are both switched on.

Figure 5:
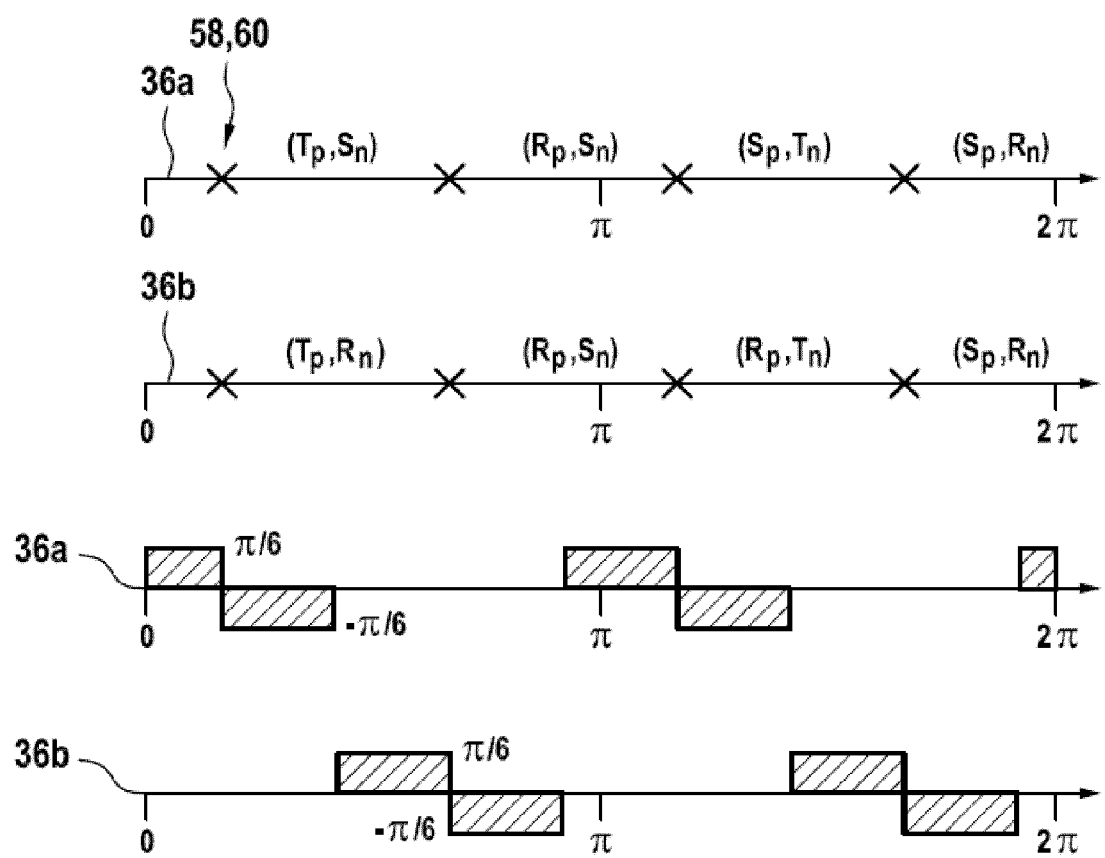
FIG. 5 shows a switching pattern according to an embodiment of the invention.

FIG. 5 shows a diagram corresponding to FIGS. 3 and 4, however, for a pulse number of 4. The order of the switchings of the inverter 34 stays the same as in FIG. 3. Every time instant 58, three thyristors 38 are switched on. This may be achieved by using the same time instants 58 for the first multi-phase bridge 36a and the second multi-phase bridge 36b and by switching additionally a thyristor 38 of an upper arm 42a and a lower arm 42b of one of the multi-phase bridges 36a, 36b at every time instant 58.

In this mode, the firing angles 50 are changed depending on the stator voltage angle 52. The firing angles 50 of the first multi-phase bridges 36a may be moved by $\pi/6$ or 30° to the right in a 1. and 5. eighth of the period and by $\pi/6$ or 30° to the left in a 2. and 5. eighth of the period with respect to the firing angles 50 of the normal pulse operation mode as shown in FIG. 3. The firing angles 50 of the second multi-phase bridges 36b may be moved by $\pi/6$ or 30° to the right in a 3. and 6. eighth of the period and by $\pi/6$ or 30° to the left in a 4. and 7. eighth of the period.

While in the above pulse operation modes with a pulse number of 12, 6 and 4 have been described in more detail, these numbers are not restrictive. In general, the pulse number also may be non-integer. In this case, the time instants 58 and pulse gaps 60 may be distributed regularly above more than one stator voltage period.

Figure 6:
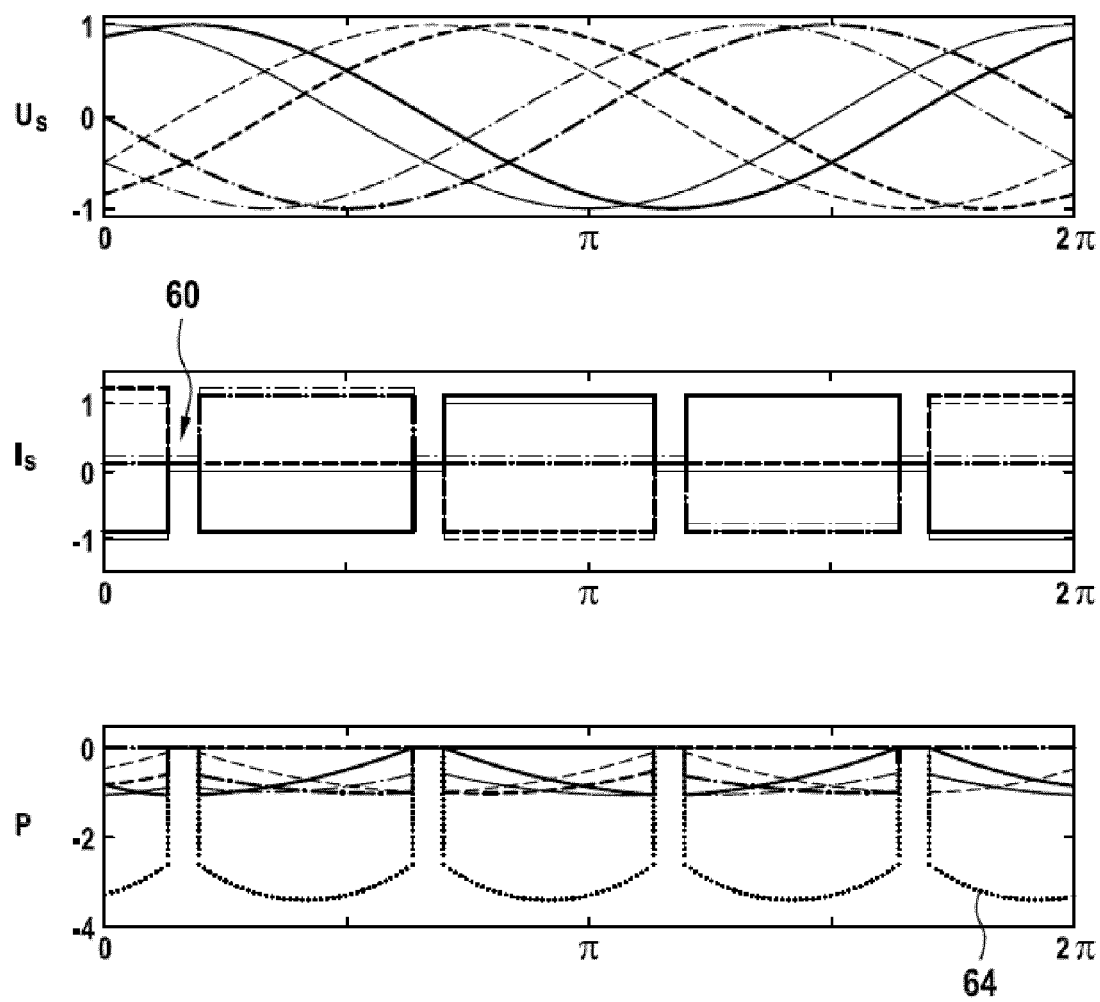
FIG. 6 shows diagrams with electrical quantities produced during performing a method according to an embodiment of the invention.

FIG. 6 shows the phase currents $I_S$, phase voltages $U_S$, and electrical powers P through the stator of the electrical machine 14 over one stator voltage period during a pulse operation mode with four pulse gaps per rotation, i.e. pulse number 4.

The stator currents $I_S$ which are formed from the DC link current show the pulse gaps 60 generated by the rectifier 28. Furthermore, it may be seen that the stator currents $I_S$ are formed from a DC link current, which is a pulse train with constant height.

The overall electrical power 64, i.e. the sum of the phase powers, has not constant height. As shown in FIG. 7, this results in an analogously shaped drive torque 66 without constant height.

FIG. 7 shows a diagram with the drive torque over one stator voltage period during a pulse operation mode with four pulse gaps per rotation, i.e. pulse number 4. Below the diagram with the drive torque 66, a diagram with the Fourier coefficients of the drive torque 66 over the frequency is shown, which shows lower higher order harmonics than the coefficients of the pulse operation mode of FIG. 3.

While the switching pattern and the positioning of the time instants 58 of the pulse operation mode shown in FIG. 5 has been optimized with respect to a DC current with constant heights, it also may be possible to optimize the switching pattern and the positioning of the time instants 58 with respect to the shaping of the drive torque T. As mentioned above and as the minimization of the cost function $J_2$ has shown, it may be beneficial to employ a piecewise constant drive torque. For example, this may be achieved by modifying the DC current reference such as to generate a piecewise constant drive torque during the pulse mode operation (for example such as in FIG. 4 or 5).

Figure 8:
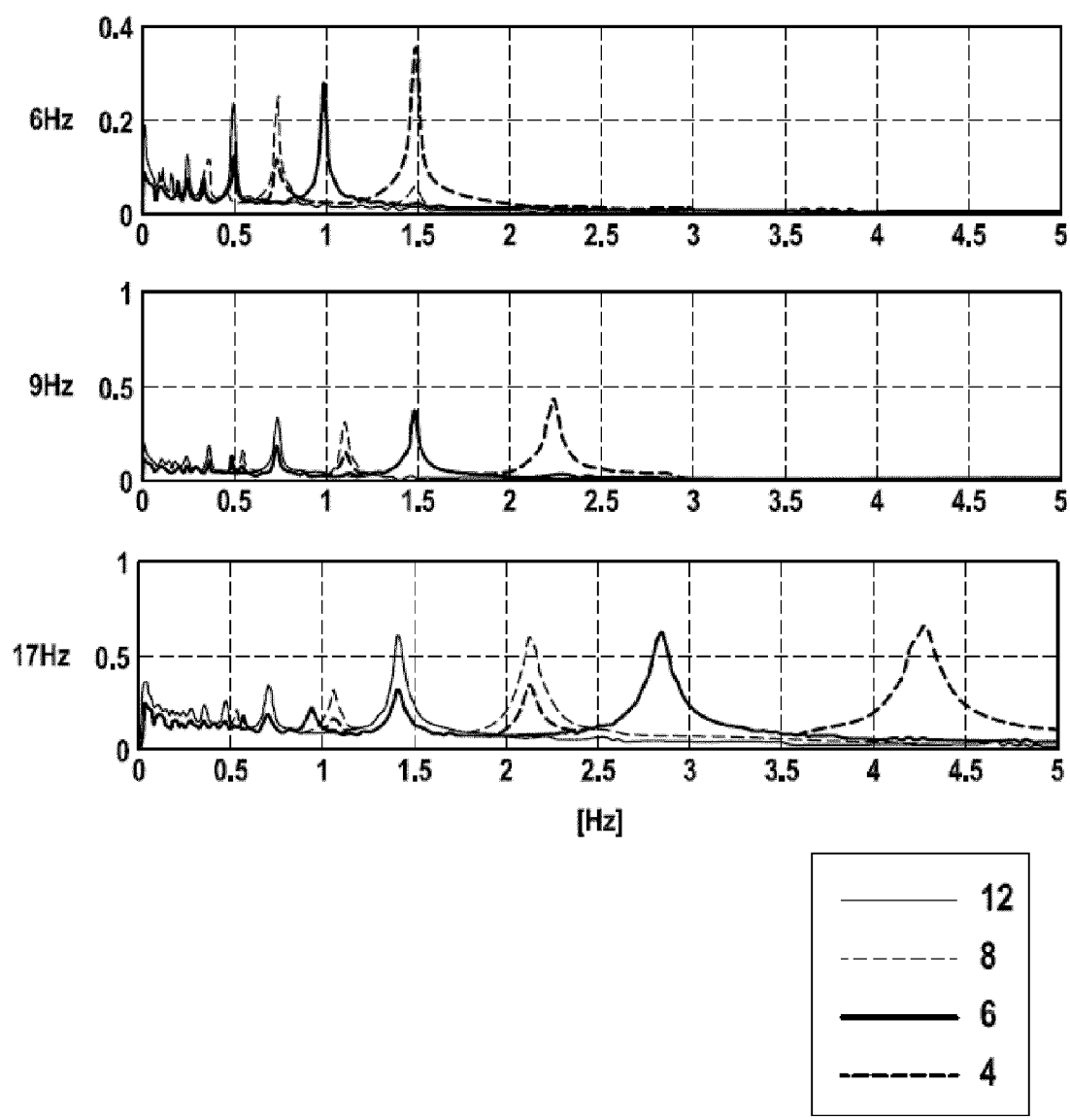
FIG. 8 shows diagrams with mechanical resonances produced during performing a method according to an embodiment of the invention.

FIG. 8 shows typical excitation of three TNFs (6 Hz, 9 Hz and 17 Hz) for different stator frequencies during different pulse operation modes (with pulse number 4, 6, 8, and 12) and thus using different numbers of time instants 58 and/or pulse gaps 60 per stator voltage period. In the diagrams, the magnitude of the excitations is depicted over the stator frequencies or rotational speeds between 0 Hz and 5 Hz.

It can be seen that by properly selecting different pulse operation modes at different stator voltage frequencies and/or rotor speeds, an overly excitation of the TNFs of the drive shaft 24 can be avoided.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 electrical drive system
12 electrical converter
14 electrical machine
16 electrical grid
18 transformer
20 excitation system
24 drive shaft
26 machinery
28 rectifier, line side converter
30 DC link
32 inductances
34 inverter, machine side converter
36 multi-phase bridge
36a first multi-phase bridge of 34
36b second multi-phase bridge of 34
38 thyristor
40 half-bridge
42a upper arm
42b lower arm
44 controller
46 rotor speed, stator voltage frequency.
48a 12-pulse generation stage
48b 8-pulse generation stage
48c 6-pulse generation stage
48d 4-pulse generation stage
50 firing angle sequence
52 stator voltage angle
54 pulse number selector stage
56 modulator
58 time instant
60 pulse gap
62 commutation signals
Rp upper thyristor for phase R
Rn lower thyristor for phase R
Sp upper thyristor for phase S
Sn lower thyristor for phase S
Tp upper thyristor for phase T
Tn lower thyristor for phase T
$I_S$ phase currents
$U_S$ phase voltages
P electrical phase powers
64 overall electrical power
66 drive torque

The invention claimed is:

1. A method for switching an electrical converter with at least two output phases, the electrical converter comprising a rectifier and a thyristor-based inverter interconnected by a DC link with an inductor, the thyristor-based inverter comprising a half-bridge with at least two half-bridge arms for each output phase of the electrical converter and each arm being provided by a thyristor, the method comprising:
   during a normal pulse operation mode, cyclically switching the thyristors of the inverter such that a pulse number, which determines at how many time instants thyristors of the inverter are switched during one stator voltage period, is equal to the number of half-bridge arms of the inverter;
   during a low pulse operation mode, cyclically switching the thyristors of the inverter, such that at least one time instant, two thyristors of different half-bridge arms are switched on simultaneously, such that the pulse number is lower than the number of half-bridge arms of the inverter;
   estimating a stator frequency of an electrical machine supplied by the electrical converter;
   switching between the normal operation mode and the low pulse operation mode based on the stator frequency, and
   wherein the low pulse operation mode is performed, when the stator frequency is below a limiting stator frequency.

2. The method of claim 1, further comprising:
   selecting the pulse number of the low pulse operation mode based on the stator frequency.

3. The method of claim 2,
   wherein during the low pulse operation mode the pulse number is equal to half the number of half-bridge arms of the inverter; or
   wherein during the low pulse operation mode the pulse number is equal to one third of the number of half-bridge arms of the inverter;
   wherein during the low pulse operation mode the pulse number is equal to two third of the number of half-bridge arms of the inverter.

4. The method of claim 2, wherein during the low pulse operation mode the pulse number is a non-integer.

5. The method of claim 2, wherein during the normal pulse operation mode each half-bridge arm is switched on one time during the stator voltage period.

6. The method of claim 1,
   wherein during the low pulse operation mode the pulse number is equal to half the number of half-bridge arms of the inverter; or
   wherein during the low pulse operation mode the pulse number is equal to one third of the number of half-bridge arms of the inverter;
   wherein during the low pulse operation mode the pulse number is equal to two third of the number of half-bridge arms of the inverter.

7. The method of claim 1, wherein during the low pulse operation mode the pulse number is a non-integer.

8. The method of claim 1, wherein during the normal pulse operation mode each half-bridge arm is switched on one time during the stator voltage period.

9. The method of claim 1, wherein two half-bridge arms simultaneously switched on are located in one multi-phase bridge of the inverter.

10. The method of claim 1, where two half-bridge arms simultaneously switched on are located in different multi-phase bridges of the inverter.

11. The method of claim 1, wherein switching patterns of different multi-phase bridges have equal time instants.

12. The method of claim 1, wherein switching patterns of different multi-phase bridges are offset with respect to each other.

13. The method of claim 1, wherein two half-bridge arms simultaneously switched on are an upper arm and a lower arm of a multi-phase bridge.

14. The method of claim 1, wherein during the low pulse operation mode at specific time instants, only one half-bridge arm of a multi-phase bridge is switched on.

15. A controller for an electrical converter, with at least two output phases, the electrical converter comprising a rectifier and a thyristor-based inverter interconnected by a DC link with an inductor, the thyristor-based inverter comprising a half-bridge with at least two half-bridge arms for each output phase of the electrical converter and each arm being provided by a thyristor, wherein the controller is operable to control the electrical converter in a manner, comprising:
   during a normal pulse operation mode, cyclically switch the thyristors of the inverter such that a pulse number, which determines at how many time instants thyristors of the inverter are switched during one stator voltage period, is equal to the number of half-bridge arms of the inverter;
   during a low pulse operation mode, cyclically switch the thyristors of the inverter, such that at least one time instant, two thyristors of different half-bridge arms are switched on simultaneously, such that the pulse number is lower than the number of half-bridge arms of the inverter;
   estimate a stator frequency of an electrical machine supplied by the electrical converter;
   switch between the normal operation mode and the low pulse operation mode based on the stator frequency, and
   wherein the low pulse operation mode is performed, when the stator frequency is below a limiting stator frequency.

16. The controller of claim 15, further comprising:
   a pulse generation state for determining a firing angle sequence for a stator voltage period at which thyristors are switched;
   a modulator for generating the time instants based on the selected firing angle sequence.

17. An electrical drive system comprising:
   a rectifier for rectifying a multi-phase current;
   a DC link with an inductor supplied by the rectifier;
   a thyristor-based inverter;
   a controller for controlling the thyristor-based inverter according to claim 15.

18. The electrical drive system according to claim 17, wherein said controller, further comprising:
   a pulse generation stage for determining a firing angle sequence for a stator voltage period at which thyristors are switched; and
   a modulator for generating the time instants based on the selected firing angle sequence.

* * * * *